R. J. McBREEN.
GARMENT FASTENER STUD.
APPLICATION FILED JUNE 15, 1918.
1,289,495.
Patented Dec. 31, 1918.
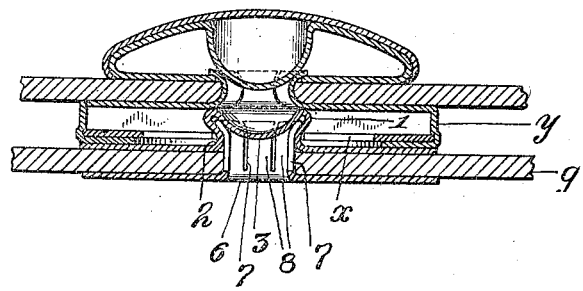
Fig. 1.
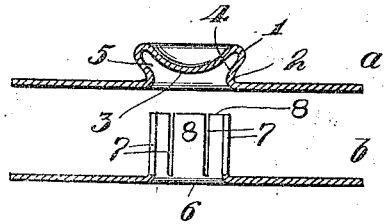
Fig. 2.
Fig. 3.
INVENTOR
Raquad J. McBreen
BY
Edward L. Beach
ATTORNEY

UNITED STATES PATENT OFFICE.

RAYMOND J. McBREEN, OF BROOKLYN, NEW YORK.

GARMENT-FASTENER STUD.

1,289,495.  Specification of Letters Patent.  Patented Dec. 31, 1918.

Application filed June 15, 1918. Serial No. 240,132.

*To all whom it may concern:*

Be it known that I, RAYMOND J. MC-BREEN, a citizen of the United States, residing in the borough of Brooklyn, city of New York, county of Kings, and State of New York, have invented certain new and useful Improvements in Garment-Fastener Studs, of which the following is a specification.

The object of my invention is to produce a stud which can be mechanically clamped to goods for use in connection particularly with the socket set forth in my companion application Serial No. 240,131, filed herewith.

In the accompanying drawings forming a part hereof,—

Figure 1 is a diametric section of said socket attached to goods and detachably connected with the goods-clamping stud forming the present invention.

Figs. 2 and 3 are respectively diametric sections of the goods-clamping and stud-forming members, separated one from the other.

The drawings show my new stud which comprises two detachable members *a* and *b*. Member *a* comprises a flat base having a central hollow projecting stud head 1, the shank being peripherally reduced at 2 to form an exterior annular seat for reception of spring members *x* carried by the socket *y*. The chambered head 1 is centrally indented forming an axial cross-sectionally round anvil 3 within the chamber of the head. The peripheral reduction at 2 forms the inner wall of the stud head chamber with an upwardly and outwardl flaring annular shoul r 4 which is concentric with the downwardly extending anvil 3, an annular space 5 being left between the opposing walls of the shoulder 4 and of anvil 3, for entrance of the flangible tubular projection 6 of the base of the member *b*. This tubular projection is slotted lengthwise at 7 to form a plurality of upsettable tongues 8 for facilitating the flaring or flanging of it when its free end is forcibly squeezed against the anvil which causes the free ends of the tongues 8 to pass flaringly through the space 5. The tubular projection is shown passed through goods *g*, its free end projecting beyond the goods. The exterior diameter of the projection 6 is made a sliding fit into the chamber of the shank portion of the stud head. The two members *a* and *b* may thus be mechanically clamped on goods of varying thicknesses, with the stud head and shank projecting for coupling with a socket secured to other goods. The stud head and shank are open on the bottom of the stud base.

What I claim is:

A garment-fastener stud comprising a pair of complementary goods-clamping members one of which comprises a base having a chambered stud head formed with an exteriorly reduced shank and open at the bottom of the base; the shank being exteriorly peripherally reduced to form a seat and being thereby formed interiorly with an upwardly and outwardly flaring annular shoulder, and the stud head being provided within the chamber with an axial, cross-sectionally round anvil concentric with and spaced apart from said shoulder to form an annular passageway between the opposed walls of the anvil and shoulder; the other member of the stud comprising a base and a tubular extension the free end of which is enterable in said passageway and adapted to be flared by compression against the anvil into the chamber above the shoulder.

In testimony whereof I have hereunto set my hand this 12th day of June, 1918.

RAYMOND J. McBREEN.